United States Patent
Faith et al.

(10) Patent No.: US 8,620,798 B2
(45) Date of Patent: Dec. 31, 2013

(54) SYSTEM AND METHOD USING PREDICTED CONSUMER BEHAVIOR TO REDUCE USE OF TRANSACTION RISK ANALYSIS AND TRANSACTION DENIALS

(75) Inventors: Patrick L. Faith, Pleasanton, CA (US); Zhongxiao Jiang, Cupertino, CA (US); Kevin Paul Siegel, Milpitas, CA (US); Theodore D. Harris, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 181 days.

(21) Appl. No.: 12/877,370

(22) Filed: Sep. 8, 2010

(65) Prior Publication Data
US 2011/0066493 A1  Mar. 17, 2011

Related U.S. Application Data

(60) Provisional application No. 61/241,811, filed on Sep. 11, 2009.

(51) Int. Cl.
*G06Q 40/00* (2012.01)

(52) U.S. Cl.
USPC ............................ 705/38; 705/39; 705/35

(58) Field of Classification Search
USPC ........................................................ 705/38
See application file for complete search history.

(56) References Cited

U.S. PATENT DOCUMENTS

| | | | |
|---|---|---|---|
| 5,819,226 A | 10/1998 | Gopinathan et al. | |
| 6,018,723 A | 1/2000 | Siegel et al. | |
| 6,108,642 A | 8/2000 | Findley | |
| 6,119,103 A | 9/2000 | Basch et al. | |
| 6,330,546 B1 | 12/2001 | Gopinathan et al. | |
| 6,598,030 B1 | 7/2003 | Siegel et al. | |
| 6,601,048 B1 | 7/2003 | Gavan et al. | |
| 6,658,393 B1 | 12/2003 | Basch et al. | |
| 6,714,919 B1 | 3/2004 | Findley | |
| 7,158,947 B1 | 1/2007 | Findley | |
| 7,227,950 B2 | 6/2007 | Faith et al. | |
| 7,251,624 B1 | 7/2007 | Lee et al. | |

(Continued)

FOREIGN PATENT DOCUMENTS

| | | |
|---|---|---|
| WO | 02/27610 A1 | 4/2002 |
| WO | 2005/077066 A2 | 8/2005 |
| WO | 2007/041709 A1 | 4/2007 |

OTHER PUBLICATIONS

International Search Report and Written Opinion mailed Sep. 9, 2010 in Application No. PCT/US2010/048304 filed Sep. 9, 2010, 9 pages.

(Continued)

*Primary Examiner* — Hai Tran
(74) *Attorney, Agent, or Firm* — Kilpatrick Townsend & Stockton LLP

(57) ABSTRACT

An apparatus and method for processing a transaction authorization request to reduce the need for a transaction risk assessment as part of the authorization process. The invention reduces both the data processing burden on the payment processor and the number of transactions for which authorization is denied. In some embodiments, the invention uses predictive or behavior modeling techniques to generate predictions of the transactions the consumer may engage in. If the consumer does engage in a predicted transaction, then a risk analysis process is not performed for that transaction.

20 Claims, 5 Drawing Sheets

(56) References Cited

U.S. PATENT DOCUMENTS

| | | |
|---|---|---|
| 7,379,916 B1 * | 5/2008 | Mizrah ............................ 705/44 |
| 7,433,855 B2 | 10/2008 | Gavan et al. |
| 7,657,460 B2 | 2/2010 | Findley |
| 7,668,769 B2 | 2/2010 | Baker et al. |
| 7,809,650 B2 | 10/2010 | Bruesewitz et al. |
| 2003/0097330 A1 | 5/2003 | Hillmer et al. |
| 2005/0027543 A1 * | 2/2005 | Labrou et al. ...................... 705/1 |
| 2006/0143075 A1 * | 6/2006 | Carr et al. ....................... 705/14 |
| 2007/0061259 A1 | 3/2007 | Zoldi et al. |
| 2007/0084913 A1 * | 4/2007 | Weston ......................... 235/380 |
| 2007/0138257 A1 * | 6/2007 | Dragt et al. ................... 235/379 |
| 2007/0192249 A1 | 8/2007 | Biffle et al. |
| 2007/0282674 A1 | 12/2007 | Gomes et al. |
| 2007/0288641 A1 | 12/2007 | Lee et al. |
| 2008/0140576 A1 * | 6/2008 | Lewis et al. ..................... 705/67 |
| 2009/0018940 A1 | 1/2009 | Wang et al. |
| 2009/0192957 A1 * | 7/2009 | Subramanian et al. ......... 706/21 |
| 2010/0138313 A1 | 6/2010 | Findley |

OTHER PUBLICATIONS

Anonymous, "Visa USA Launches Advanced Authorization Anti-Fraud Technology," [online], Jun. 2005 [retrieved on Feb. 10, 2009]. Retrieved from the Internet< URL: http://www.paymentsnews.com/2005/06/visa__usa__launch.html>.

Anonymous, "Visa Advanced Authorization Anti-Fraud Technology in Latin America," [online], Jan. 2009 [retrieved on Feb. 10, 2009]. Retrieved from the Internet< URL: http://www.paymentsnews.com/2009/01/visa-advance-au.html>.

Anonymous, "Visa USA Launches Anti-Fraud Technology," [online], no date given [retrieved on Feb. 10, 2009]. Retrieved from the Internet< URL: http://www.prnewswire.com/cgi-bin/stories.pl?ACCT=104&STOR . . . >.

* cited by examiner

300

SYSTEM AND METHOD USING PREDICTED CONSUMER BEHAVIOR TO REDUCE USE OF TRANSACTION RISK ANALYSIS AND TRANSACTION DENIALS

CROSS-REFERENCES TO RELATED APPLICATIONS

This application claims priority to U.S. Provisional Patent Application No. 61/241,811, filed on Sep. 11, 2009, the complete disclosure of which is incorporated herein by reference for all purposes.

This application incorporates by reference for all purposes the entire contents of the following:

(1) United States Patent Application Publication No. US 2005/0149455, published Jul. 7, 2005, entitled "Method and System for Providing Advanced Authorization";

(2) U.S. Pat. No. 6,119,103, issued Sep. 12, 2000, entitled "Financial Risk Prediction Systems and Methods Therefor;"

(3) U.S. Pat. No. 6,018,723, issued Jan. 25, 2000, entitled "Method and Apparatus for Pattern Generation;"

(4) U.S. Pat. No. 6,658,393, issued Dec. 2, 2003, entitled "Financial Risk Prediction Systems and Methods Therefor;"

(5) U.S. Pat. No. 6,598,030, issued Jul. 22, 2003, entitled "Method and Apparatus for Pattern Generation"; and (6) U.S. Patent Application Publication No. US 2002/0194503, published Dec. 19, 2002, entitled "Distributed Quantum Encrypted Pattern Generation and Scoring."

BACKGROUND

Embodiments of the present invention are directed to systems, apparatuses and methods for processing transaction data, and more specifically, to generating predictions concerning consumer behavior and using that information to assist in deciding whether to authorize or deny a transaction. Embodiments of the invention may be used for multiple types of transactions, including, but not limited to, payment transactions, ATM (automated teller machine) transactions, money transfer transactions, etc.

Consumer payment devices such as debit cards or credit cards are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include consumer or account identification or authentication data, for example. Some or all of the data read from the payment device is provided to the merchant's transaction processing system and then to the acquirer, which is typically a bank or other institution that manages the merchant's account. The data provided to the acquirer may then be provided to a payment processing network (e.g., a network that includes a payment processor) which processes the data to determine if the transaction should be authorized by the network, and assists in the clearance and account settlement functions for the transaction. The authorization decision and clearance and settlement portions of the overall transaction may also involve communication and/or data transfer between the payment processing network and the bank or institution that issued the payment device to the consumer (the issuer). Transactions in which a consumer payment device is presented to a merchant or accessed by a point of sale terminal are termed "card present" transactions since the payment device is in the same physical location as the merchant or terminal.

In addition to card present transactions, a consumer may also initiate a transaction in a situation in which the payment device is not in the same physical location as the merchant or terminal and instead the relevant data is provided over a communications network to the merchant (termed a "card not present" transaction). For example, a transaction involving the purchase of a product or service may be initiated by a consumer by providing payment data from a remote location to a merchant over a network such as the Internet. Transactions of this type are typically initiated using a computing device such as a personal computer or laptop computer. Transactions may also be initiated by using a mobile device such as a cell phone or personal data assistant (PDA) that communicates with a merchant or service provider directly or indirectly over a wireless network (which may be configured to enable data transfer between the wireless network and the Internet). Thus, payment information for a transaction may be provided using a payment device and point of sale terminal, remotely located computing device, or mobile device capable of wireless communications, among other methods.

Given the large number of transactions and amounts of money involved, the detection and prevention of fraud is an important consideration of any transaction processing system. In order to address this problem, payment processors and others involved in authorizing payment transactions have developed data analysis tools designed to identify fraudulent behavior that is part of a transaction, within an individual account, or over a set of transactions as a whole. One of these tools is termed "Advanced Authorization" and is described in U.S. Patent Application Publication No. US 2005/0149455, which as noted, is incorporated by reference into the present application in its entirety. Advanced Authorization may be used as a form of transaction risk analysis to provide an issuer with an estimate or indicator of the risk associated with a specific transaction. This allows the issuer to consider the risk involved prior to authorizing the transaction. If the risk analysis indicates an unacceptable level of risk for the particular transaction, then the issuer can refuse or deny the transaction. This prevents the consumer from being able to complete the transaction with a merchant.

Although Advanced Authorization and other forms of risk analysis provide a benefit to the parties involved in transactions, such transaction data processing tools do have disadvantages. A first disadvantage is that they increase the computational burden on the payment processor or other part of the transaction data processing network that implements the risk analysis tool. Secondly, transaction denials tend to create a disincentive for honest consumers to use the payment processing system. This may be termed the false-positive decline problem, where a transaction that is incorrectly identified as fraudulent or potentially fraudulent is refused, leading to the loss of a sale and in some cases, the creation of a negative impression on the part of a consumer. Both of these disadvantages or problems suggest that if possible, it would be desirable to reduce the instances in which a risk analysis method is applied to a transaction authorization request.

What is desired are a system, apparatus and method for determining whether to generate a risk analysis for a proposed transaction as part of the transaction authorization process, with the goal of reducing instances in which such a risk analysis is used. Embodiments of the invention address these problems and other problems individually and collectively.

SUMMARY

Embodiments of the present invention are directed to a system, apparatus, and method for determining whether to generate a risk analysis for a proposed transaction as part of the transaction authorization process. The invention reduces both the data processing burden on the payment processor and the number of transactions for which authorization is denied. In some embodiments, the invention uses predictive or behavior modeling techniques to generate predictions of the transactions a consumer may engage in. If the consumer does engage in a predicted transaction, then a risk analysis process is not performed for that transaction. Embodiments of the invention may be used for multiple types of transactions, including, but not limited to, payment transactions, ATM (automated teller machine) transactions, money transfer transactions, etc.

In one embodiment, the present invention is directed to an apparatus for processing a transaction, where the apparatus includes a processor configured to execute a set of instructions, a memory coupled to the processor for storing the set of instructions, and the set of instructions stored in the memory, wherein when executed by the processor the instructions implement a process to process consumer data to generate a set of one or more predicted transactions, the predicted transactions being those the consumer may be expected to engage in, receive a request to authorize the transaction, compare the transaction to the set of predicted transactions, and if the transaction is the same as or sufficiently similar to a transaction in the set of predicted transactions, then not perform a transaction risk assessment, and if the transaction is not the same as or sufficiently similar to a transaction in the set of predicted transactions, then perform a transaction risk assessment.

In another embodiment, the present invention is directed to a method of processing a transaction, where the method includes processing consumer data using an electronic computing device to generate a set of one or more predicted transactions, the predicted transactions being those the consumer may be expected to engage in, receiving a request to authorize the transaction, comparing the transaction to the set of predicted transactions, and if the transaction is the same as or sufficiently similar to a transaction in the set of predicted transactions, then not performing a transaction risk assessment, and if the transaction is not the same as or sufficiently similar to a transaction in the set of predicted transactions, then performing a transaction risk assessment.

Other objects and advantages of the present invention will be apparent to one of ordinary skill in the art upon review of the detailed description of the present invention and the included figures.

DETAILED DESCRIPTION

Figure 1:
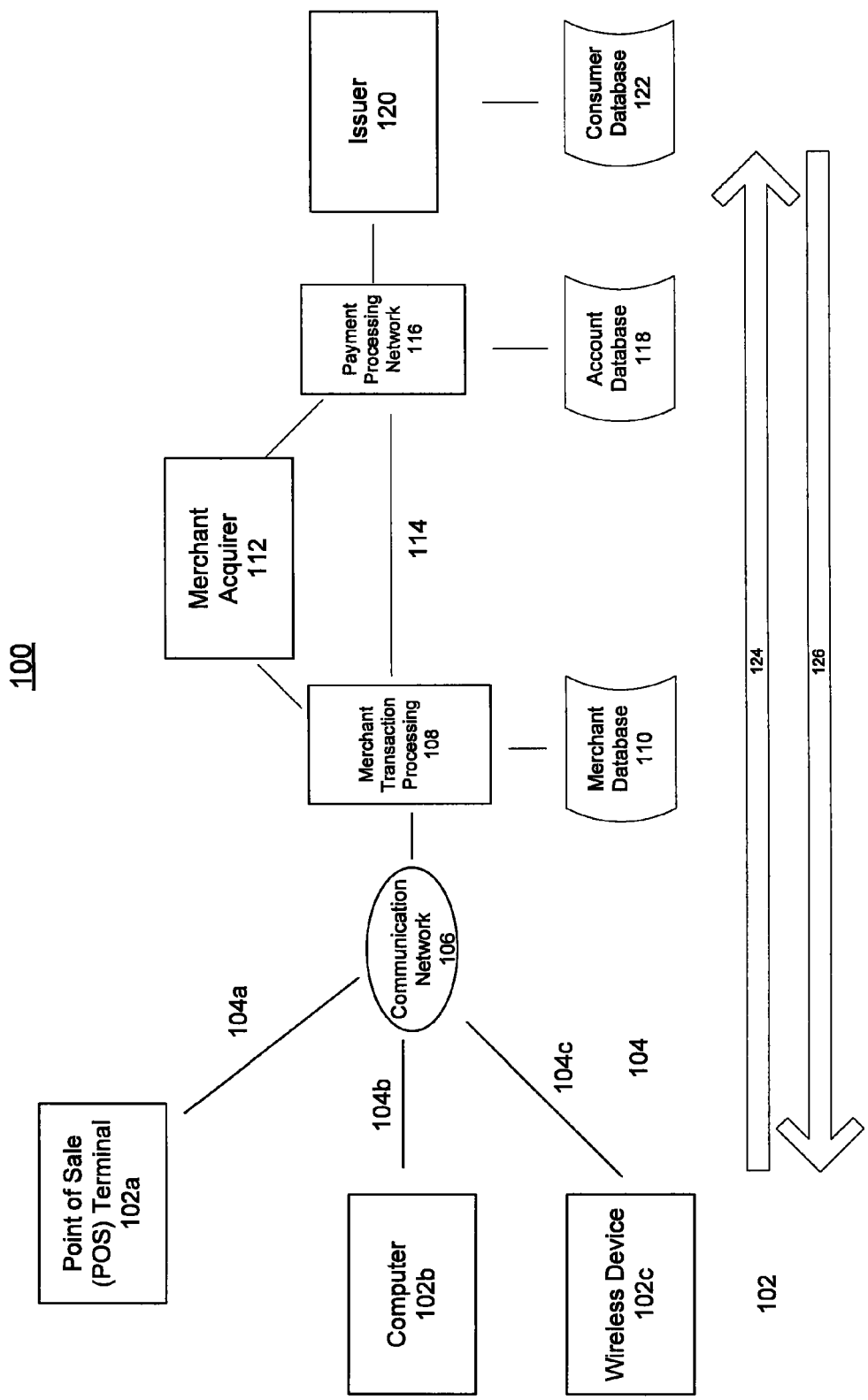
FIG. 1 is a functional block diagram illustrating the primary functional elements of an exemplary system for authorizing an electronic transaction.

Before proceeding to describe one or more embodiments of the present invention, and to assist with providing a better understanding of the invention, it may be useful to define some terms that will be used in describing the inventive system, apparatus, and method. In the context of the present invention:

A "consumer" is a customer to a transaction, or user of a payment device or device into which payment data may be entered and provided to a merchant as part of a transaction.

A "merchant" is a provider of goods or services to a consumer and is a party to a transaction initiated by a consumer. A merchant may be physically present at a transaction or conduct a transaction remotely, for example, via a network connection.

A "payment device" is a credit card, debit card, or other device or element from which payment data may be read or otherwise communicated. Payment devices are typically used in card present transactions.

A "consumer device" is a device into which a consumer enters payment or account data, with that data being communicated to a merchant as part of a transaction. Example consumer devices include, but are not limited to, home or business computers, mobile phones, PDAs, laptop computers, and the like. Consumer devices are typically used in card not present transactions, such as electronic commerce transactions conducted over the Internet. In some cases, a consumer device may include a payment device in the form of an embedded contactless device or chip.

An "authorization request" is an electronic message containing data regarding a proposed transaction that is typically generated by a merchant's transaction processing system and is used by a payment processor and/or other elements of a payment processing system to determine whether to authorize the transaction.

A "transaction risk assessment" is a method or process that involves processing data regarding a proposed transaction, either alone or in addition to other data that may be relevant (e.g., consumer financial data, consumer preferences data, fraud detection data, etc.), to determine the relative risk of the proposed transaction being fraudulent or otherwise undesirable.

A "predicted" or "expected" transaction is a payment transaction or other form of transaction that a consumer is expected to participate in based on analysis of relevant consumer and transaction data. Such a transaction may be generated by processing data regarding a consumer's previous transactions, the consumer's preferences (with regards to merchants, specific goods or services, etc.), the consumer's location, the consumer's purchasing behaviors over time or as a function of the date, location, a prior transaction, etc.

In the context of the present invention, a "processor" can include any suitable computation device that can be programmed to process or execute instructions, where the instructions are stored in a data storage device or on a computer readable medium. A processor may be embodied by one or more microprocessors capable of processing data. A "payment processor" may include a processor that is specifically suited to processing payment transaction data.

As will be described, embodiments of the present invention are directed to a system, apparatus, and method for using predictions of consumer behavior or activities as part of the transaction authorization process. In some embodiments, the present invention uses consumer data to predict the transactions or types of transactions that a consumer is likely to engage in. If the consumer does engage in one of the predicted transactions (as may be indicated by a transaction authorization request), then a transaction risk assessment process is not performed. If the consumer engages in a transaction that is not one of the predicted transactions, then a transaction risk assessment may be performed in accordance with normal operating procedures. As described, embodiments of the invention may be used for multiple types of transactions, including, but not limited to, payment transactions, ATM (automated teller machine) transactions, money transfer transactions, etc.

Prior to describing one or more embodiments of the invention in greater detail, a brief discussion of the entities involved in authorizing an electronic payment or other form of transaction and their roles in the authorization process will be presented with regards to FIG. 1, which is a functional block diagram illustrating the primary functional elements of an exemplary system 100 for authorizing an electronic transaction. As shown in FIG. 1, in a typical transaction, a consumer wishing to purchase a good or service from a merchant provides transaction data that may be used as part of an authorization process by means of a device 102. The consumer may utilize a payment device such as a card having a magnetic strip encoded with account data or other relevant data (e.g., a standard credit or debit card) to initiate the transaction. In an E-commerce (electronic commerce) transaction, the consumer may enter data into a consumer device capable of communicating with a merchant or other element of system 100, such as a laptop or personal computer. The consumer may also initiate the transaction using data stored in and provided from a suitable form of data storage device (such as a smart card, mobile phone, PDA, or transportable memory device). As examples, a card or similar payment device may be presented to a point of sale terminal 102a which scans or reads data from that card. Similarly, a consumer may enter payment account data into a computing device 102b, as part of an E-commerce transaction. Further, a consumer may enter payment account data into a cell phone or other wireless device 102c (e.g., a laptop computer or PDA) and have that data communicated to the transaction authorization network by the device (or the consumer may have previously entered and stored data, where that data is then accessed and provided to the network as part of the transaction). Point of sale terminal 102a is an example of a merchant device and computing device 102b and cell phone or wireless device 102c are examples of a consumer device.

The payment account data (as well as any other required data, such as consumer data) is communicated over a communication network 106 to the merchant's transaction processing system 108. The data may be provided to communication network 106 by any method or elements suitable for use with device 102. For example, if device 102 is a point of sale terminal 102a, then the data may be provided by a wireline phone connection or suitable form of connection 104a to the Internet or other network. If device 102 is a consumer's computing device 102b, then the data may be provided by a connection to the Internet 104b, such as a cable modem or wireless router. If device 102 is a cell phone or other wireless device 102c, then the data may be provided by a wireless network 104c to communication network 106 (e.g., using the intermediary of a gateway configured to couple a wireless network to a second network, such as the Internet). Depending on the merchant or transaction involved, communication network 106 may be the Internet, a closed network such as a corporate network, a wireless network, or other suitable form of data transport channel.

As part of the authorization process performed by the merchant, merchant transaction processing system 108 may access merchant database 110, which typically stores data regarding the consumer (as the result of a registration process with the merchant, for example), the consumer's payment device, and the consumer's transaction history with the merchant. Merchant transaction processing system 108 typically communicates with Merchant Acquirer 112 (which manages the merchant's accounts) as part of the overall authorization process. Merchant transaction processing system 108 and/or Merchant Acquirer 112 provide data to Payment Processing Network 116, which among other functions, participates in the clearance and settlement processes which are part of the overall transaction processing. Communication and data transfer between Merchant transaction processing system 108 and Payment Processing Network 116 may be by means of a direct connection 114 or by means of an intermediary, such as Merchant Acquirer 112. As part of the transaction authorization process, Payment Processing Network 116 may access account database 118, which typically contains information regarding the consumer's account payment history, chargeback or dispute history, credit worthiness, etc. Payment Processing Network 116 communicates with Issuer 120 as part of the authorization process, where Issuer 120 is the entity that issued the payment device (or provided another form of data to enable a consumer to pay for goods or services) to the consumer and manages the consumer's account. Consumer account data is typically stored in consumer database 122 which is accessed by Issuer 120 as part of the authorization and account management processes.

In standard operation, an authorization request message is created during a consumer purchase (or proposed purchase) of a good or service at a point of sale (POS). The point of sale may be a merchant's physical location or a virtual point of sale such as a web-site that is part of an E-commerce transaction. In a typical transaction, the authorization request message is sent from the point of sale to the Merchant transaction processing system 108, then to Merchant Acquirer 112, then to the Payment Processing Network 116, and then to Issuer 120. An "authorization request message" can include a request for authorization to conduct an electronic transaction. It may include one or more of an account holder's payment account number, currency code, sale amount, merchant transaction stamp, acceptor city, acceptor state/country, etc. As will be discussed with reference to FIG. 2, an authorization request may be supplemented by a transaction risk assessment that is generated prior to the request being provided to the issuer.

An authorization request message may be protected using a secure encryption method (e.g., 128-bit SSL or equivalent) in order to prevent data from being compromised. In a typical transaction authorization process, an authorization request message is communicated between nodes as indicated by arrow 124 in FIG. 1, while an authorization response (i.e., an approval or denial by an issuer or payment processing network) is communicated between nodes as indicated by arrow 126 in FIG. 1.

Payment Processing Network 116 may include data processing subsystems, networks, and other means of implementing operations used to support and deliver authorization services, exception file services, and clearing and settlement services for transactions. An exemplary Payment Processing Network may include VisaNet. Payment Processing Networks such as VisaNet are able to process credit card transactions, debit card transactions, and other types of commercial transactions. VisaNet, in particular, includes a VIP system (Visa Integrated Payments system) which processes authorization requests and a Base II system which performs clearing and settlement services.

Payment Processing Network 116 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 116 may use any suitable wired or wireless network, including the Internet, to permit communication and data transfer between network elements. Among other functions, Payment Processing Network 116 may be responsible for ensuring that a user is authorized to conduct the transaction (via an authentication process), confirm the identity of a party to a transaction (via receipt of a personal identification number), confirm a sufficient balance or credit line to permit a purchase, generate a transaction risk assessment, and reconcile the amount of a purchase with the user's account (via entering a record of the transaction amount, date, etc.).

Figure 2:
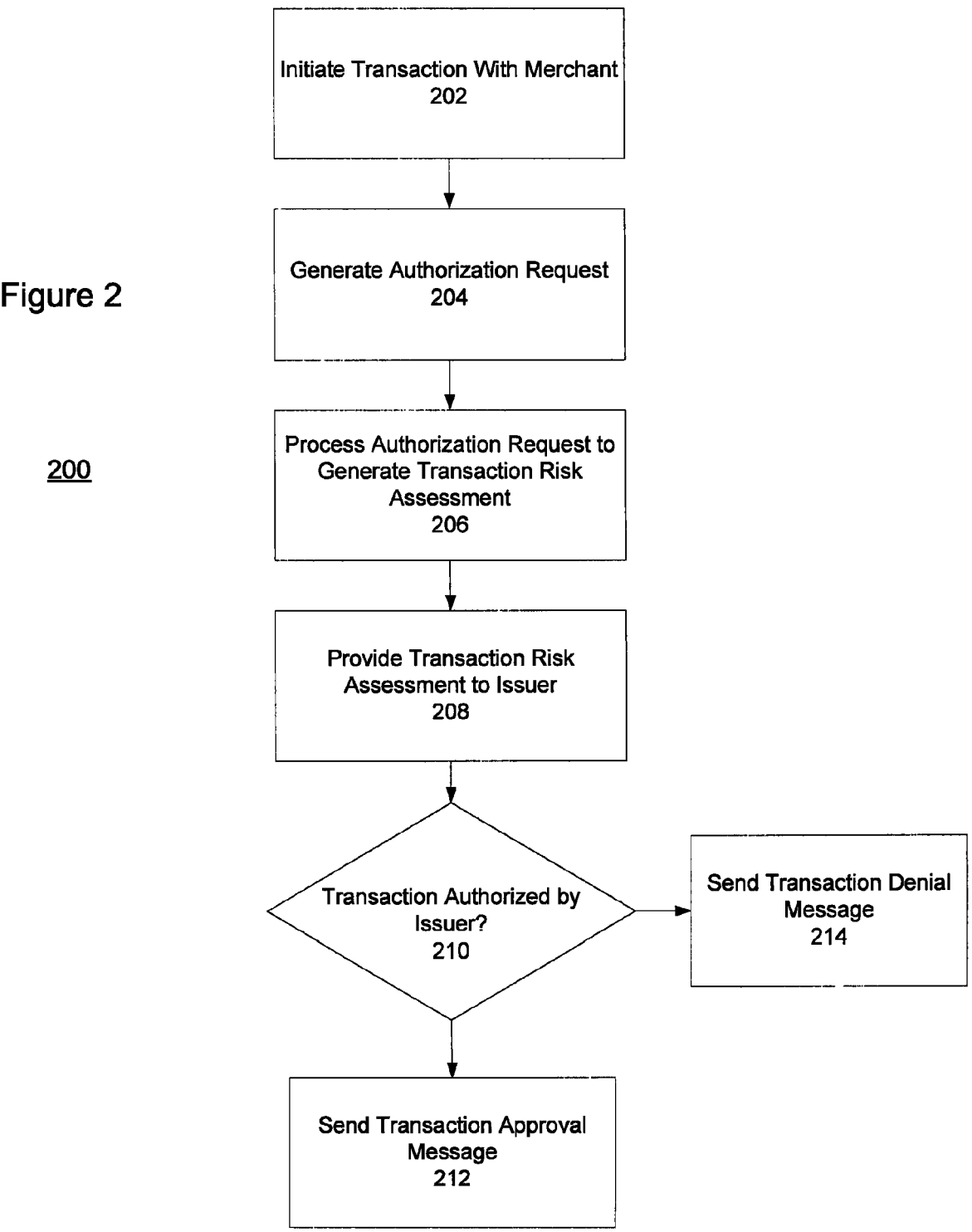
FIG. 2 is a flowchart illustrating a transaction authorization process that includes generation of a transaction risk assessment that is provided to an Issuer.

FIG. 2 is a flowchart illustrating a transaction authorization process 200 that includes generation of a transaction risk assessment that is provided to an issuer. As shown in the figure, a consumer initiates a transaction with a merchant (stage 202). The transaction may be initiated using any suitable device, including but not limited to, a point of sale terminal (POS), a mobile phone, or a computing device communicating with a merchant. In response to initiating the transaction, an authorization request is generated (stage 204). The authorization request may include relevant information about the consumer, the account being used by the consumer, the transaction, and the merchant. At some point in the authorization process, the authorization request is received by a payment processor or element of a payment processing network. The authorization request is processed to generate a transaction risk assessment (stage 206). The transaction risk assessment is an evaluation by the payment processor as to the risk or risks associated with the transaction. The transaction risk assessment may be generated based on processing the data contained in the authorization request, either alone or along with other data available to the payment processor. The data processing methods or techniques used to generate the transaction risk assessment may include any suitable and relevant methods, including but not limited to, predictive algorithms, neural networks, behavior modeling, pattern matching, etc. Further information regarding the data used in generating a transaction risk assessment and the method or methods that may be used to generate the assessment may be found in the previously mentioned U.S. Patent Application Publication No. 2005/0149455 entitled "Method and System for Providing Advanced Authorization", the contents of which is incorporated by reference into the present application.

After generation of the transaction risk assessment, the risk assessment is provided to the issuer (stage 208). The risk assessment may take the form of a score or indicator, along with explanation codes, and may be included as part of the authorization request or authorization message. The issuer uses the risk assessment and other relevant information to decide whether to authorize (approve or deny) the transaction (stage 210). If the issuer decides to authorize (approve) the transaction, then an approval message or other form of authorization is generated and provided to the relevant parties (e.g., the merchant), as depicted at stage 212. if the issuer decides not to authorize the transaction, then a transaction denial message or other form of denial of authorization is generated and provided to the relevant parties (e.g., the merchant), as depicted at stage 214.

Although the transaction risk assessment process described with reference to FIG. 2 is an important component of a fraud reduction program, it does have certain disadvantages. One disadvantage is that generation of the risk assessment increases the computational burden on the payment processor or other part of the transaction data processing network that implements the transaction risk analysis process. Further, transaction denials tend to create a disincentive for honest consumers to use the payment processing system. This can be a problem because a false-positive decline can occur when a transaction is incorrectly identified as fraudulent or potentially fraudulent, and as a result is refused. This can lead to the loss of a legitimate sale and in some cases, the creation of a negative impression on the part of a consumer. Both of these disadvantages or problems suggest that it would be desirable to reduce the instances in which a risk analysis method is applied to a transaction as a means of reducing both computational overhead and the number of transaction denials.

To address these problems, in some embodiments, the present invention is directed to a process and to an apparatus that includes a programmed processor that executes instructions to implement the process, where the process includes predicting the behavior of a consumer with regards to the transactions that the consumer would be expected to engage in. The prediction may be based on an analysis of previous transactions, consumer consumption patterns, consumer profiles, consumer financial data, for example. The prediction may also be based, in part or in whole, on consumer location or other attributes that may be used to generate a prediction of a transaction or transactions that the consumer is expected to engage in. If the consumer does engage in a predicted transaction, then a transaction risk assessment is not performed as part of the transaction authorization request processing. In addition, if the consumer engages or is expected to engage in a predicted transaction, a coupon or other promotional (e.g., marketing) material may be provided to the consumer. The provided material may serve as a form of authentication when the consumer uses it as part of a transaction.

Figure 3:
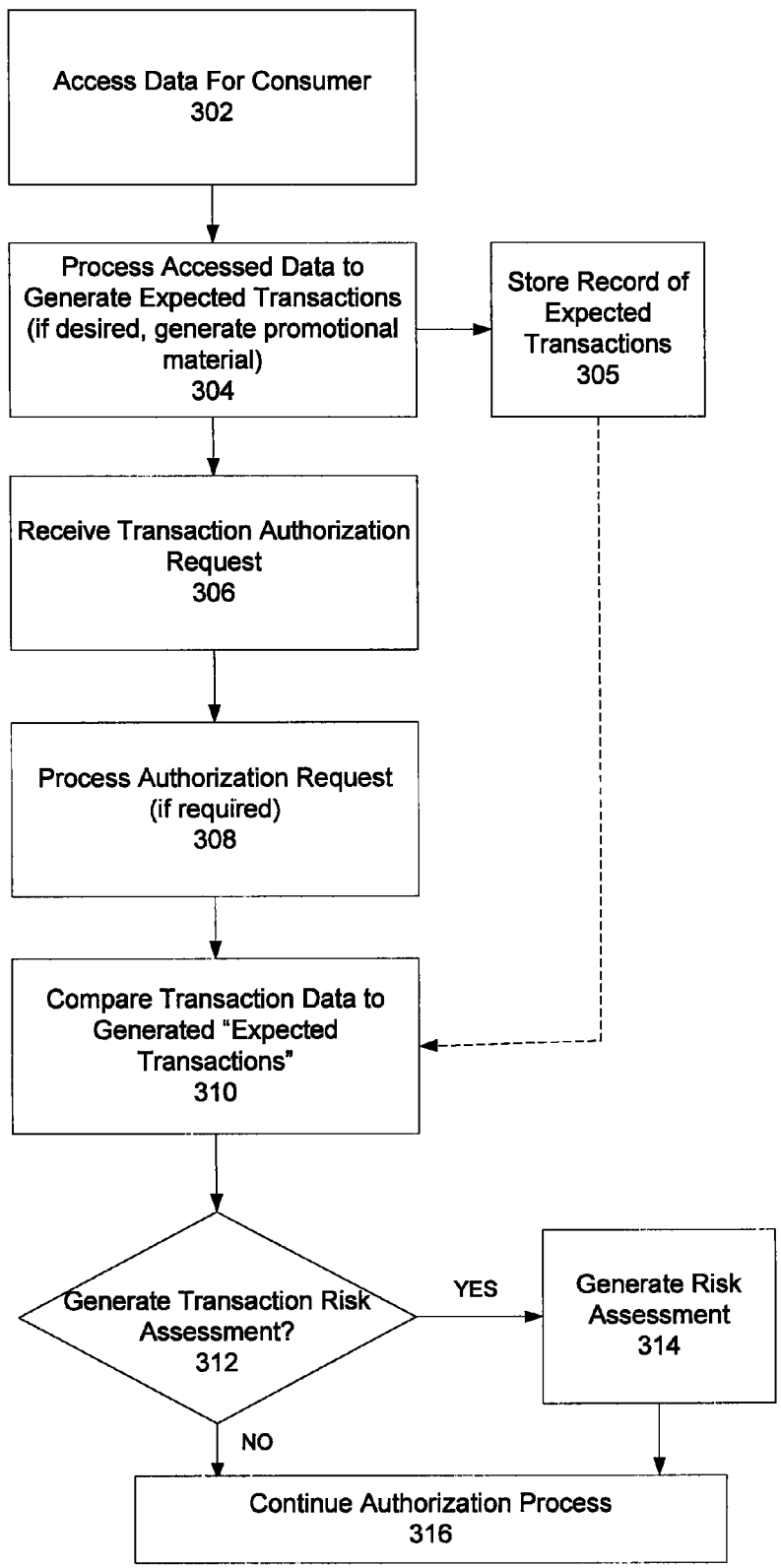
FIG. 3 is a flowchart illustrating a method for using expected or predicted consumer behavior to determine whether to generate a transaction risk assessment as part of a transaction authorization process, in accordance with some embodiments of the present invention.

FIG. 3 is a flowchart illustrating a method 300 for using expected or predicted consumer behavior to determine whether to generate a transaction risk assessment as part of a transaction authorization process, in accordance with some embodiments of the present invention. The method or process stages described with reference to FIG. 3 may be implemented as part of a larger method or process, as additional process steps or stages may be added without departing from the concept of the invention. Further, the inventive method or process may be executed as a standalone routine or as a sub-part of a larger routine. Although the method or process described will typically be implemented by a payment processor, it may also be implemented by other elements of a payment processing network or data processing system. Although typically implemented as a set of instructions stored in a memory or data storage device and executed in whole or in part by a programmed processor or computing device, the inventive method or process may also be implemented as a set of logic gates or other form of hardware. The set of instructions may also be stored on a computer-readable medium that may be accessed by a processor or computing device.

As shown in FIG. 3, data concerning a consumer is accessed at stage 302. The data may be contained in one or more databases, data storage devices or other data structures. The data may be accessed over a network or other data communications element. The data may include, but is not limited to, transaction records, financial records, consumer profile data, consumer preference data (with regards to merchants, types of goods or services, etc.), transaction location or frequency data for previous transactions (e.g., to provide a prediction that the consumer may engage in a specific transaction because of the consumer's location, the consumer's preference for a specific merchant, the consumer's behavior of regularly conducting a certain type of transaction), etc. The data may be maintained by a payment processor, an element of a payment processing network, or another relevant source. After access, the consumer related data is processed to generate a set of one or more "expected" or "predicted" transactions" (stage 304). The set of expected transactions are predictions of the expected consumer behavior based on the accessed data and the application of one or more data processing or analysis techniques to the data. The data processing or analysis techniques may take the form of neural networks, predictive modeling techniques, behavior simulations, recommendation engines, pattern matching algorithms, etc. In general, any analysis process may be used that is capable of using the consumer data as an input and generating a prediction as to a transaction or transactions that the consumer is likely or expected to engage in at a later time. Previously referred to U.S. Patent Application Publication No. US 2005/0149455 entitled "Method and System for Providing Advanced Authorization", as well as the other materials that are incorporated by reference into this application describe techniques that may be used as part of the process of generating the predicted, likely, or expected transactions.

Several examples of possible results of the output of stage 304 will be given; it is understood that these are for exemplary purposes only and that the output of stage 304 may take any suitable form and be derived using one or more suitable data processing techniques. For example, the analysis at stage 304 may suggest that a consumer purchases gasoline on a semi-regular basis, and that such purchases are made predominantly at one of a small number of gas stations. The analysis might also suggest that on days that the consumer purchases gas they also are more likely to purchase a parking pass. The analysis might also suggest that the consumer purchases a particular service once a month at approximately the same time of the month, or when they are near a particular location. The analysis might also indicate that the consumer makes a certain type of purchase on a regular basis at a merchant or group of merchants whose places of business fall within a certain zip code or other geographic region. Other examples will be apparent to one of skill in the art; the underlying concept or idea is that processing of consumer related data can be used to provide a prediction or suggestion of a transaction or transactions that the consumer is likely to engage in. Processing of the consumer data may also provide a prediction or suggestion regarding characteristics of the transaction(s) that a consumer is likely to engage in, such as amount of the transaction, frequency of a transaction, correlations between types or characteristics of transactions (i.e., if a consumer engages in one type of transaction, they are likely to engage in a second transaction within a specified amount of time), etc. After the set of expected transactions is generated, data regarding those transactions may be stored in a suitable data storage element or device (stage 305).

At stage 306 a transaction authorization request is received, typically at a payment processor or other element of a payment processing network. The authorization request will typically contain information about the consumer (such as identification, account number, security or access data, etc.) and information about the transaction for which authorization is being requested (such as amount, identification of the merchant, location, etc). If required, the authorization request may be processed (as depicted at stage 308) to enable its comparison to one or more expected or predicted transactions generated at stage 304. Such processing may include extraction of certain data, mapping of certain data or codes to merchant identifiers, location identifiers, transaction types, etc. After any required processing, the authorization request data is compared to a list or set of expected or predicted consumer transactions (stage 310). The list or set of expected or predicted consumer transactions (or other data regarding those transactions) may be accessed from a local data storage medium, device, or database, or provided over a suitable communications network. Comparison of the authorization request data to the expected or predicted transactions may involve determining if the transaction (or an identifier or characteristic of the transaction) for which authorization is requested matches or is similar enough to one or more of the predicted transactions to cause the payment processor to decide that a transaction risk assessment is not necessary. Whether there is a match or sufficient similarity may be determined by any suitable technique, including, but not limited to, pattern matching, statistical data analysis, comparison of certain values or characteristics, thresholding, etc.

For example, if the transaction for which authorization is desired is of the same type (e.g., fuel) and at an expected frequency, but at a different merchant, then a risk assessment may not be needed (note that if the transaction is at a previously used merchant and at an expected frequency, then it would presumably not require a risk assessment). Similarly, if the transaction for which authorization is requested is of a different type (e.g., food) but is at a merchant that the consumer has used before, then a risk assessment may not be needed. Further, if the transaction for which authorization is desired is of the same or similar type as those engaged in previously and is within the same zip code or geographic region as the previous transactions, then the transaction may not require a risk assessment.

Note further that the determination of whether to perform a risk assessment for a transaction may be a dynamic process; that is, based on the factors considered in making the determination, a risk assessment may be desired at one time for a particular transaction, but a risk assessment for the same or a similar transaction may not be required at a different time. Also, the determination of whether or not to perform a risk assessment may be a function of the amount of "trust" or "trustworthiness" that the payment processor places in a consumer or merchant. This trust or trustworthiness may increase when a consumer engages in an expected or predicted transaction. In response to the increase in trust, the payment processor may decide that a transaction risk assessment is not needed as frequently (or at all) for certain transactions, for transactions having certain characteristics, for certain categories of transactions, etc.

After comparison of the authorization request data to the list of expected or predicted consumer transactions, the payment processor decides whether to generate a transaction risk assessment for the transaction, or whether to continue the authorization process without generating the risk assessment (stage 312). In most cases, if the authorization request data indicates that authorization is being sought for a transaction that is one of the predicted or expected transactions (or is sufficiently similar to one of the predicted or expected transactions), then a transaction risk assessment is not generated. Similarly, if the authorization request data indicates that authorization is being sought for a transaction that is not one of the predicted or expected transactions (or is not sufficiently similar to one of the predicted or expected transactions), then a transaction risk assessment is generated (stage 314). After generation of a transaction risk assessment or deciding that one is not necessary, the transaction authorization process continues (stage 316), typically as described with reference to stage 208 (and subsequent stages). Note that if a transaction risk assessment is not performed, a message may be sent to the issuer confirming that the transaction is a "good" one or is otherwise valid.

Note that after generating the set of one or more "expected" or "predicted" transactions (stage 304), a consumer may be provided with promotional material, such as a coupon, advertisement, or other form of incentive to encourage the consumer to engage in one of the "expected" or "predicted" transactions, or in a transaction that is related to, or is recommended to the consumer based on, one of the expected or predicted transactions. The promotional material may be registered so that upon initiating the transaction and presenting the promotional material, the consumer may be identified or authenticated by the payment processor, thereby preventing the need for a transaction risk assessment.

Note also that although the figure shows the expected or predicted transactions being generated prior to receipt of a transaction authorization request, the invention may also be used to generate the expected or predicted transactions after receiving the authorization request but before deciding whether to generate a transaction risk assessment.

Figure 4:
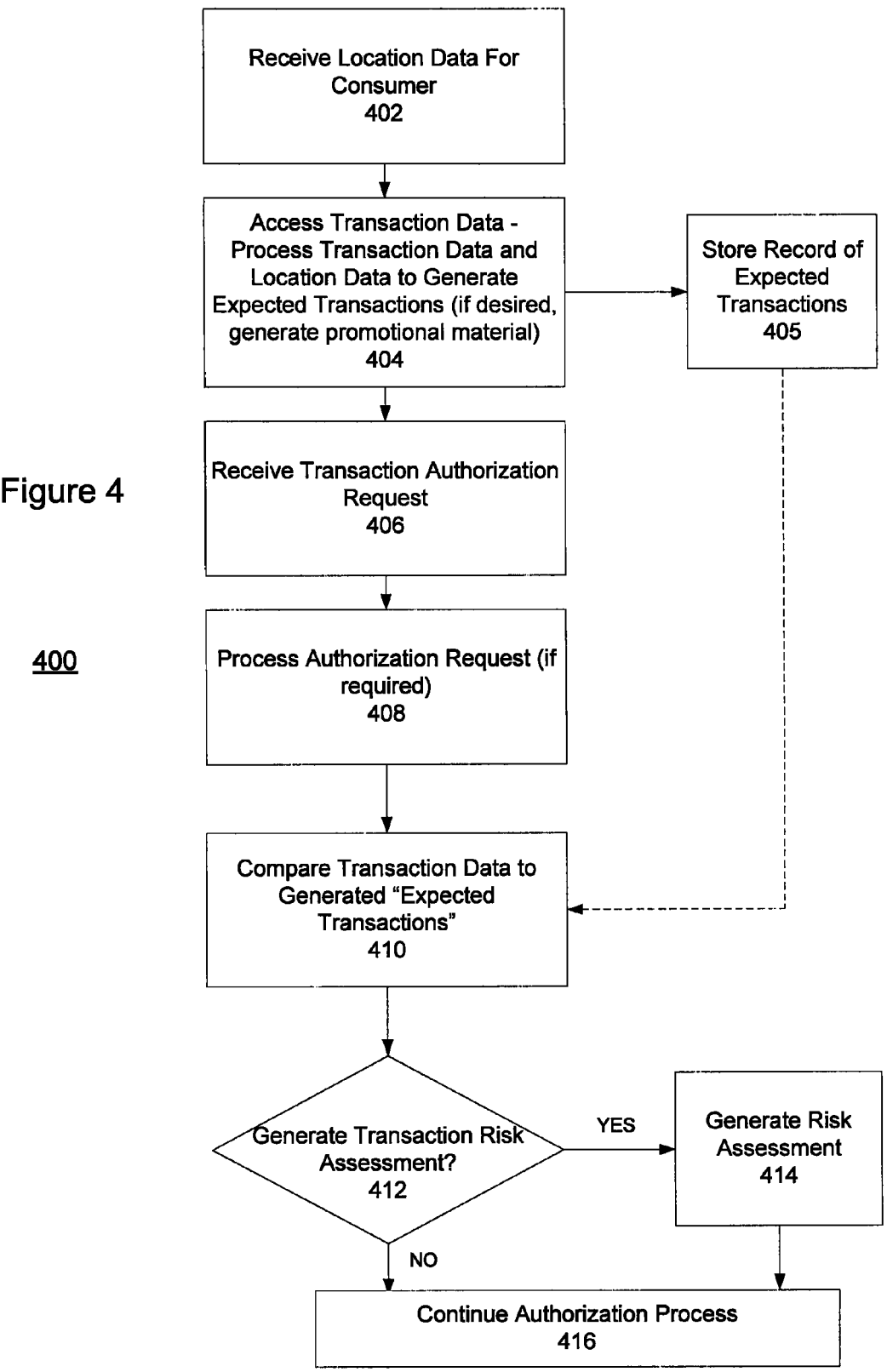
FIG. 4 is a flowchart illustrating a second method for using expected or predicted consumer behavior to determine whether to generate a transaction risk assessment as part of a transaction authorization process, in accordance with some embodiments of the present invention.

FIG. 4 is a flowchart illustrating a second method 400 for using expected or predicted consumer behavior to determine whether to generate a transaction risk assessment as part of a transaction authorization process, in accordance with some embodiments of the present invention. The method or process stages described with reference to FIG. 4 may be implemented as part of a larger method or process, as additional process steps or stages may be added without departing from the concept of the invention. Further, the inventive method or process may be executed as a standalone routine or as a sub-part of a larger routine. Although the method or process described will typically be implemented by a payment processor, it may also be implemented by other elements of a payment processing network or data processing system. Although typically implemented as a set of instructions stored in a memory or data storage device and executed in whole or in part by a programmed processor or computing device, the inventive method or process may also be implemented as a set of logic gates or other form of hardware. The set of instructions may also be stored on a computer-readable medium that may be accessed by a processor or computing device.

In the embodiment of FIG. 4, a consumer's location is used as part of the process of determining whether or not to perform a transaction risk assessment when the consumer initiates a transaction. The location data may be used in several ways. It may be used as a filtering mechanism to select which of a set of possible transactions are the most likely to be engaged in by the consumer (e.g., by using the location as a post-filter to reduce a set of possible transactions to only those within a certain radius of the consumer's location, thereby reducing the processing requirements for subsequent stages of the process). The location data may also be used to determine the set of transactions that are considered to be possible by only identifying those transactions within a certain radius of the location (e.g., by using the consumer location as a pre-filter to select the data used to generate the set of predicted or likely transactions). The location data may also be used to provide additional confidence that a transaction engaged in by a consumer is one for which a risk assessment is not necessary because the transaction occurred within a certain distance or radius from the consumer's location (where that location may be associated with a previous valid transaction).

In the method or process depicted in FIG. 4, a consumer's location is used as an additional piece of information to improve the process of predicting a transaction that the consumer is likely to engage in. As shown at stage 402, the consumer's location is determined and provided to a payment processor or other element of a payment processing system. The location may be determined by any suitable process or inferred from other data, such as the location associated with a previous transaction. For example, the consumer's location may be determined from a transmission from a mobile phone or other wireless device (such as a GPS fix or triangulation from cell towers, etc.). As another example, the location may be inferred because of a transaction earlier in the day that may be associated with a region or location (such as by referring to the location of the merchant that was a party to the previous transaction).

At stage 404, data concerning a consumer is accessed, as described with reference to stage 302 of FIG. 3. The data may be contained in one or more databases, data storage devices or other data structures. The data may be accessed over a network or other data communications element. The data may include, but is not limited to, transaction records, financial records, consumer profile data, consumer preference data (with regards to merchants, types of goods or services, etc.), transaction location or frequency data for previous transactions (e.g., to provide a prediction that the consumer may engage in a specific transaction because of the consumer's location, the consumer's preference for a specific merchant, the consumer's behavior of regularly conducting a certain type of transaction), etc. The data may be maintained by a payment processor, an element of a payment processing network, or another relevant source.

After access, the consumer related data and the location data is processed to generate a set of one or more "expected" or "predicted" transactions (shown in the figure as occurring at stage 404, but with the understanding that the data processing may be separate from the data access stage). As described with reference to FIG. 3, the set of expected or predicted transactions are "predictions" of the expected consumer behavior based on the accessed data and application of one or more data processing or analysis techniques to the data. The data processing or analysis techniques may take the form of neural networks, predictive modeling techniques, behavior simulations, recommendation engines, pattern matching algorithms, etc. In general, any analysis process may be used that is capable of using the consumer data as an input and generating a prediction as to a transaction or transactions that the consumer is likely to engage in later. Previously referred to U.S. Patent Application Publication No. US 2005/0149455 entitled "Method and System for Providing Advanced Authorization", as well as the other materials that are incorporated by reference into this application describe techniques that may be used as part of the process of generating the predicted or likely transactions. After the set of predicted or expected transactions is generated, data regarding those transactions may be stored in a suitable data storage element or device (stage 405).

At stage 406 a transaction authorization request is received, typically at a payment processor or other element of a payment processing network. The authorization request will typically contain information about the consumer (such as identification, account number, security or access data, etc.) and information about the transaction for which authorization is being requested (such as amount, identification of the merchant, location, etc). If required, the authorization request may be processed (as depicted at stage 408) to enable its comparison to one or more expected or predicted transactions generated at stage 404. Such processing may include extraction of certain data, mapping of certain data or codes to merchant identifiers, location identifiers, transaction types, etc. After any required processing, the authorization request data is compared to a list or set of expected or predicted consumer transactions (stage 410). The list or set of expected or predicted consumer transactions (or other data regarding those transactions) may be accessed from a local data storage medium, device, or database, or provided over a suitable communications network. As described with reference to FIG. 3, comparison of the authorization request data to the expected or predicted transactions may involve determining if the transaction (or an identifier or characteristic of the transaction) for which authorization is requested matches or is similar enough to one or more of the predicted transactions to cause the payment processor to decide that a transaction risk assessment is not necessary. Whether there is a match or sufficient similarity may be determined by any suitable technique, including, but not limited to, pattern matching, statistical data analysis, comparison of certain values or characteristics, thresholding, etc.

After comparison of the authorization request data to the list of expected or predicted consumer transactions, the payment processor decides whether to generate a transaction risk assessment for the transaction, or whether to continue the authorization process without generating the risk assessment (stage 412). In most cases, if the authorization request data indicates that authorization is being sought for a transaction that is one of the predicted or expected transactions (or is sufficiently similar to one of the predicted or expected transactions), then a transaction risk assessment is not generated. Similarly, if the authorization request data indicates that authorization is being sought for a transaction that is not one of the predicted or expected transactions (or is not sufficiently similar to one of the predicted or expected transactions), then a transaction risk assessment is generated (stage 414). After generation of a transaction risk assessment or deciding that one is not necessary, the transaction authorization process continues (stage 416), typically as described with reference to stage 208 (and subsequent stages). Note that if a transaction risk assessment is not performed, a message may be sent to the Issuer confirming that the transaction is a "good" one or is otherwise valid.

Note that after generating the set of one or more "expected" or "predicted" transactions (stage 404), a consumer may be provided with promotional material, such as a coupon, advertisement, or other form of incentive to encourage the consumer to engage in one of the "expected" or "predicted" transactions or in a transaction that is related to, or is recommended to the consumer based on, one of the expected or predicted transactions. The promotional material may be registered so that upon initiating the transaction and presenting the promotional material, the consumer may be identified or authenticated by the payment processor, thereby preventing the need for a transaction risk assessment.

Note also that although the figure shows the expected or predicted transactions being generated prior to receipt of a transaction authorization request, the invention may also be used to generate the expected or predicted transactions after receiving the authorization request but before deciding whether to generate a transaction risk assessment. Further, the location data for the consumer may be obtained as part of the transaction authorization request as well as prior to receipt of the request (and as discussed, may be used as a pre-filter or post-filter for the predicted or expected transaction data).

Figure 5:
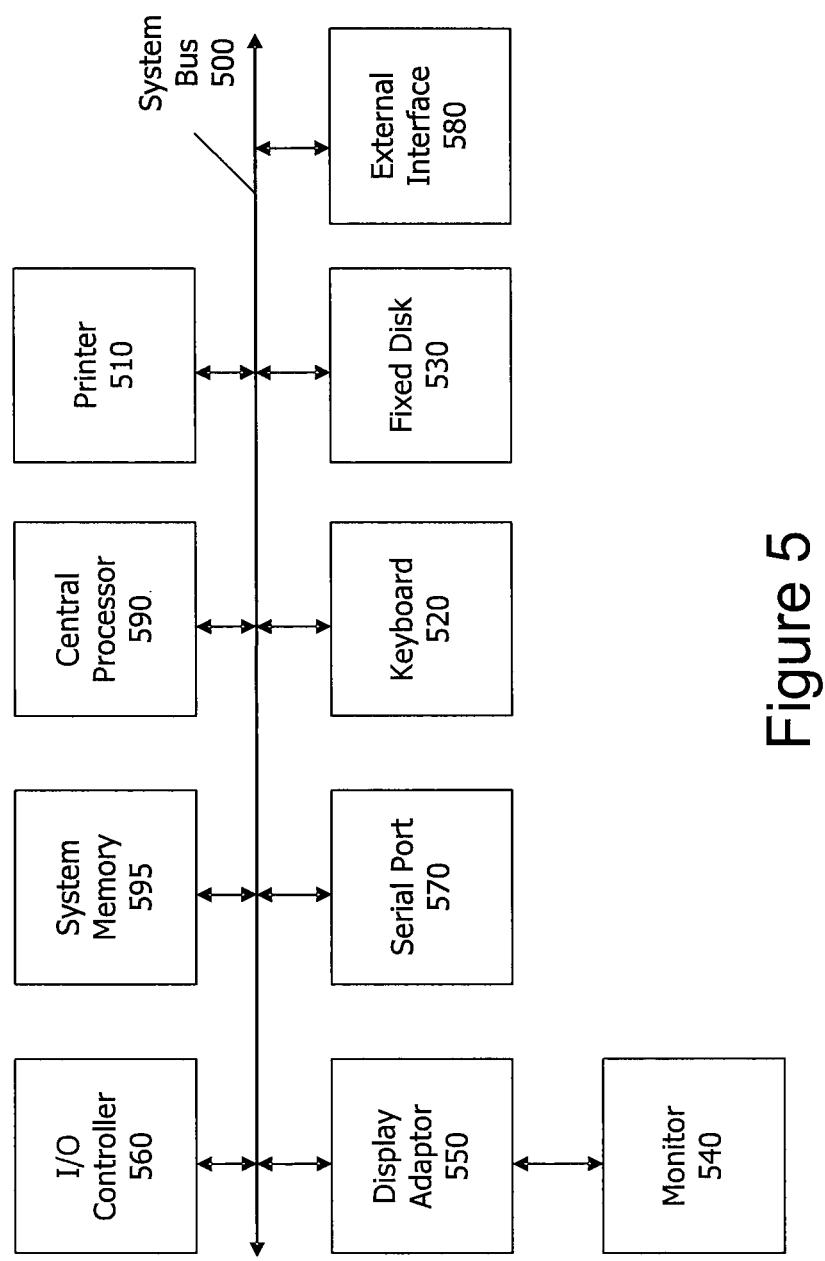
FIG. 5 is a block diagram of elements that may be present in a computer device or system configured to execute a method or process for using expected or predicted consumer behavior to determine whether to generate a transaction risk assessment as part of a transaction authorization process, in accordance with some embodiments of the invention.

In some embodiments, the inventive methods, processes or operations for reducing the use of a transaction risk assessment may be wholly or partially implemented in the form of a set of instructions executed by a central processing unit (CPU) or microprocessor. The CPU or microprocessor may be incorporated in an apparatus, server or other computing device operated by, or in communication with, a node of the authorization network. As an example, FIG. 5 is a block diagram of elements that may be present in a computer device or system configured to execute a method or process for reducing fraud in electronic transactions, in accordance with some embodiments of the invention. The subsystems shown in FIG. 5 are interconnected via a system bus 500. Additional subsystems such as a printer 510, a keyboard 520, a fixed disk 530, a monitor 540, which is coupled to a display adapter 550, and others are shown. Peripherals and input/output (I/O) devices, which couple to an I/O controller 560, can be connected to the computer system by any number of means known in the art, such as a serial port 570. For example, the serial port 570 or an external interface 580 can be used to connect the computer apparatus to a wide area network such as the Internet, a mouse input device, or a scanner. The interconnection via the system bus 500 allows a central processor 590 to communicate with each subsystem and to control the execution of instructions that may be stored in a system memory 595 or the fixed disk 530, as well as the exchange of information between subsystems. The system memory 595 and/or the fixed disk 530 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An apparatus for determining whether to perform a transaction risk assessment on a transaction, comprising:
   a processor configured to execute a set of instructions;
   a memory coupled to the processor for storing the set of instructions; and
   the set of instructions stored in the memory, wherein when executed by the processor the instructions implement a process to:
   process consumer data to generate a set of one or more predicted transactions, the predicted transactions being those the consumer may be expected to engage in;
   receive a request to authorize the transaction;
   obtain a location of the consumer;
   reduce the set of predicted transactions to only the predicted transactions within a radius of the location of the consumer;
   compare the transaction to the set of predicted transactions; and
   if one or more characteristics of the transaction are substantially the same as one or more characteristics of a transaction in the set of predicted transactions, then not perform a transaction risk assessment, and if one or more characteristics of the transaction are not substantially the same as one or more characteristics of a transaction in the set of predicted transactions, then perform the transaction risk assessment.

2. The apparatus of claim 1, wherein the consumer data comprises one or more of consumer transaction records, consumer financial records, consumer profile data or consumer preference data.

3. The apparatus of claim 1, wherein processing the consumer data comprises processing the data by applying one or more of a neural network, predictive modeling technique, behavior simulation, recommendation engine, or pattern matching algorithm to the accessed data.

4. The apparatus of claim 1, wherein the characteristics comprise one or more of a merchant, a time, a frequency, a location, and a type.

5. The apparatus of claim 1, wherein one or more characteristics of the transaction are substantially the same as one or more characteristics of a transaction in the set of predicted transactions when one or more characteristics of the transaction match one or more characteristics of a transaction in the set of predicted transactions.

6. The apparatus of claim 1, wherein the location of the consumer is obtained from the consumer data.

7. The apparatus of claim 6, wherein the location of the consumer is the location of the consumer at the time of the transaction.

8. The apparatus of claim 1, wherein the set of instructions comprises instructions that implement a process to generate a promotional material for the consumer, the material being generated in response to the set of predicted transactions.

9. The apparatus of claim 8, wherein the promotional material is one or more of a coupon, advertisement, or other form of incentive.

10. The apparatus of claim 8, wherein when provided by the consumer, the promotional material is used in a process of authenticating the consumer or authorizing a transaction to which the promotional material applies.

11. A method of determining whether to perform a transaction risk assessment on a transaction, comprising:
    processing consumer data using an electronic computing device to generate a set of one or more predicted transactions, the predicted transactions being those the consumer may be expected to engage in;
    receiving a request to authorize the transaction;
    obtaining a location of the consumer;
    reducing the set of predicted transactions to only the predicted transactions within a radius of the location of the consumer;
    comparing the transaction to the set of predicted transactions; and
    if one or more characteristics of the transaction are substantially the same as one or more characteristics of a transaction in the set of predicted transactions, then not performing a transaction risk assessment, and if one or more characteristics of the transaction are not substantially the same as one or more characteristics of a transaction in the set of predicted transactions, then performing a transaction risk assessment.

12. The method of claim 11, wherein the consumer data comprises one or more of consumer transaction records, consumer financial records, consumer profile data or consumer preference data.

13. The method of claim 11, wherein processing the consumer data comprises processing the data by applying one or more of a neural network, predictive modeling technique, behavior simulation, recommendation engine, or pattern matching algorithm to the accessed data.

14. The method of claim 11, wherein the characteristics comprise one or more of a merchant, a time, a frequency, a location, and a type.

15. The apparatus of claim 11, wherein one or more characteristics of the transaction are substantially the same as one or more characteristics of a transaction in the set of predicted transactions when one or more characteristics of the transaction match one or more characteristics of a transaction in the set of predicted transactions.

16. The method of claim 11, wherein the location of the consumer is obtained from the consumer data.

17. The method of claim 16, wherein the location of the consumer is the location of the consumer at the time of the transaction.

18. The method of claim 11, further comprising generating a promotional material for the consumer, the material being generated in response to the set of predicted transactions.

19. The method of claim 18, wherein the promotional material is one or more of a coupon, advertisement, or other form of incentive.

20. The method of claim 18, wherein when provided by the consumer, the promotional material is used in a process of authenticating the consumer or authorizing a transaction to which the promotional material applies.

* * * * *